(12) United States Patent
Kishida et al.

(10) Patent No.: US 7,356,238 B2
(45) Date of Patent: Apr. 8, 2008

(54) OPTICAL FIBER MEASURING MODULE HAVING BASE MEMBER HOLDING OPTICAL FIBER CABLE

(75) Inventors: Kinzo Kishida, c/o Neubrex Co., Ltd., 1-KIO-315, Minatojima 9-chome, Chuo-ku, Kobe-shi, Hyogo 650-0045 (JP); Kazuyoshi Itoh, Kawanishi (JP); Motohiro Nakano, Higashiosaka (JP); Masayuki Matsumoto, Hirakata (JP); Hiroyuki Toda, Sakai (JP); Yong Wang, Taijiri-cho (JP); Yoshiaki Yamauchi, Ibaraki (JP)

(73) Assignee: Kinzo Kishida (JP)

( * ) Notice: Subject to any disclaimer, the term of this patent is extended or adjusted under 35 U.S.C. 154(b) by 0 days.

(21) Appl. No.: 10/535,572

(22) PCT Filed: Nov. 27, 2002

(86) PCT No.: PCT/JP02/12353

§ 371 (c)(1),
(2), (4) Date: May 19, 2005

(87) PCT Pub. No.: WO2004/048889

PCT Pub. Date: Jun. 10, 2004

(65) Prior Publication Data

US 2006/0001863 A1    Jan. 5, 2006

(51) Int. Cl.
*G02B 6/36* (2006.01)
*G02B 6/00* (2006.01)
*G01J 1/04* (2006.01)

(52) U.S. Cl. .................. 385/137; 385/136; 385/88; 250/227.14

(58) Field of Classification Search ..............
250/227.14–227.18, 227.28; 385/88–91, 385/136, 137
See application file for complete search history.

(56) References Cited

U.S. PATENT DOCUMENTS

| | | | | |
|---|---|---|---|---|
| 4,795,231 | A | * | 1/1989 | Tanabe ................ 385/60 |
| 4,990,769 | A | * | 2/1991 | Hazan et al. ......... 250/227.16 |
| 5,594,819 | A | * | 1/1997 | Narendran et al. ...... 385/12 |
| 6,559,437 | B1 | * | 5/2003 | Pope et al. ........... 250/227.14 |
| 2001/0019103 | A1 | * | 9/2001 | Sugai et al. ........... 250/227.18 |
| 2002/0051598 | A1 | * | 5/2002 | Atoji et al. ............ 385/11 |

(Continued)

FOREIGN PATENT DOCUMENTS

JP    9-14927    1/1997

(Continued)

OTHER PUBLICATIONS

Dictionary.com Unabridged (v 1.1).

(Continued)

*Primary Examiner*—Georgia Epps
*Assistant Examiner*—Brian J Livedalen
(74) *Attorney, Agent, or Firm*—Gerald E. Hespos; Anthony J. Casella

(57) ABSTRACT

An optical fiber measuring module is provided with an optical fiber cable (2) including an optical fiber core (2a), a cladding (2b) and a covering layer (2c), a base member (3) for holding the optical fiber cable (2), and an attachment member (4) for attaching the base member (3) to a structure (1).

16 Claims, 12 Drawing Sheets

U.S. PATENT DOCUMENTS

2003/0063888 A1* 4/2003 Sahlin et al. ............... 385/134

FOREIGN PATENT DOCUMENTS

| JP | 2002-48516 | 2/2002 |
| JP | 2002-131025 | 5/2002 |
| JP | 2002-262422 | 9/2002 |

OTHER PUBLICATIONS

American Heritage Dictionary.
Online Etymology Dictionary, 2001 Douglas Harper.
Kernerman English Multilingual Dictionary (Beta Version).

* cited by examiner

|  | ELONGATIVE DISTORTION OF THE FIBER CABLE | | |
|---|---|---|---|
|  | 2d | 2e | 2f |
| ELONGATION OF x-AXIS | + | + | + |
| LATERAL PRESSURE ACTS ON A PORTION C IN z-AXIS DIRECTION | 0 | 0 | + |
| BENDING FORCE ABOUT z-AXIS | + | − | 0 |

OPTICAL FIBER MEASURING MODULE HAVING BASE MEMBER HOLDING OPTICAL FIBER CABLE

FIELD OF TECHNOLOGY

The present invention relates to an optical fiber measuring module which is laid on a structure such as a bridge, a tunnel or a building to measure the distortion, the temperature or other physical quantity of the structure.

TECHNOLOGICAL BACKGROUND

In recent years, there have been developed various optical fiber measuring modules for measuring the distortion, the temperature or other physical quantity of a structure such as a bridge, a tunnel or a building using characteristics of an optical fiber.

This optical fiber measuring module generally includes an optical fiber core, a cladding, and a covering layer and is adapted to measure the distortion, the temperature or other physical quantity of the optical fiber core by causing a discontinuous pump light such as a laser beam to be incident on the optical fiber core to create a scattered light resulting from the distortion, the temperature and the like of the optical fiber core such as Brillouin scattering or Raman scattering and by detecting the scattered light. Since this optical fiber measuring module can measure a physical quantity at an arbitrary position along the longitudinal direction of the optical fiber core by controlling a sampling timing for detecting the scattered light, it is used for the remote measurement of a distortion, a temperature and the like at an arbitrary position of a structure. Various related technologies have been and are being developed.

For example, Japanese Unexamined Patent Publication No. H09-14927 discloses a technology concerning an optical fiber sensor comprised of a metal tube and a spiral optical fiber held in contact with the inner circumferential surface of the metal tube, and a method for measuring the distortion of a structure using such an optical fiber sensor.

Further, Japanese Unexamined Patent Publication No. 2002-131025 discloses a technology concerning a surface distortion sensor for measuring the distortion of a concrete structure to confirm the progress of a damage of the concrete structure by holding one or more optical fiber cables between sheet-shaped materials through which an adhesive is permeable to fix the optical fiber cables and adhering the resulting sheet to an outer surface of the concrete structure using the adhesive.

However, with the technologies of the above optical fiber measuring module, there are problems of difficulty to rebuild an optical fiber net once this net is cut, and likeliness to damage the optical fiber core required to be carefully handled upon attachment or detachment.

For example, in the case of the technology disclosed in Japanese Unexamined Patent Publication No. H09-14927, it is not easy to attach the metal tube provided with the optical fiber to the structure while aligning it with the structure and the optical fiber core may be damaged if bending or other working is applied to the metal tube.

In the case of the technology disclosed in Japanese Unexamined Patent Publication No. 2002-131025 as well, there are not only a problem that it is not easy to attach and detach the optical fiber measuring module, but also a problem that an excessive load acts on the optical fiber cable upon peeling off the adhered sheet and the optical fiber cores are likely to be damaged since the sheet-shaped optical fiber measuring module is adhered to the outer surface of the concrete structure using the adhesive.

In view of the above problems, an object of the present invention is to provide an optical fiber measuring module which can be easily attached to and detached from a structure, and is free from damaging an optical fiber core required to be carefully handled upon attachment and detachment.

SUMMARY OF THE INVENTION

According to an aspect of the present invention, an optical fiber measuring module is to be laid on a structure for measuring at least one physical quantity from the distortion and temperature of the structure. The optical fiber measuring module is provided with an optical fiber cable including an optical fiber core, a cladding and a covering layer. The module is further provided with a base member for holding the optical fiber cable, and an attachment member for attaching the base member to the structure.

These and other objects, features, aspects, and advantages of the present invention will become more apparent from the following detailed description of the preferred embodiments/examples with reference to the accompanying drawings.

BRIEF DESCRIPTION OF THE DRAWINGS

FIGS. 4A and 4B are sections showing a modification of a locking device of the optical fiber measuring module according to the second embodiment of the invention, wherein FIG. 4A shows a state where a base member is attached to an attachment member by the locking device and FIG. 4B shows an intermediate state during the detachment of the base member from the attachment member.

FIGS. 5A, 5B and 5C are diagrams showing a construction of an optical fiber measuring module according to a third embodiment of the invention, wherein FIG. 5A is a plan view showing the construction of the optical fiber measuring module according to the third embodiment, FIG. 5B is a side view of an attachment member, and FIG. 5C is a graph showing the intensity of a distortion acting on an optical fiber cable after the base member is attached to the attachment member.

FIGS. 7A and 7B are diagrams showing a construction of an optical fiber measuring module according to a fifth embodiment of the invention, wherein FIG. 7A is a perspective view of the optical fiber measuring module and FIG. 7B is a table showing effects of the optical fiber measuring module.

FIGS. 17A and 17B are side views showing a construction of a loading mechanism of the polarizing ring, wherein FIG. 17A shows a state where the length of a discontinuous portion is not changed by a loading member and FIG. 17B shows a state where the length of the discontinuous portion is changed by the loading member.

FIGS. 18A and 18B show a modification of the base member, wherein FIG. 18A is a perspective view of the modification of the base member and FIG. 18B is a graph of a distortion of the optical fiber cable showing an effect of the modification of the base member.

BEST MODES FOR CARRYING OUT THE INVENTION

Figure 1:
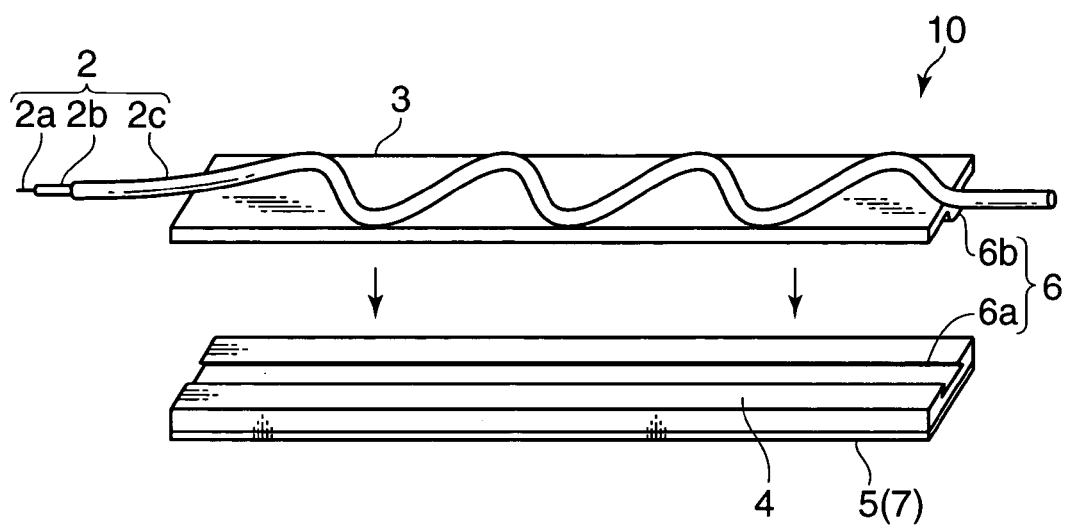
FIG. 1 is a perspective view showing a construction of an optical fiber measuring module according to a first embodiment of the invention.

Hereinafter, preferred embodiments of the present invention are described in detail with reference to the accompanying drawings. FIG. 1 is a perspective view showing a construction of an optical fiber measuring module according to a first embodiment of the invention, and FIG. 2 is a perspective view showing the attachment of the optical fiber measuring module according to the first embodiment of the invention to a structure.

Figure 2:
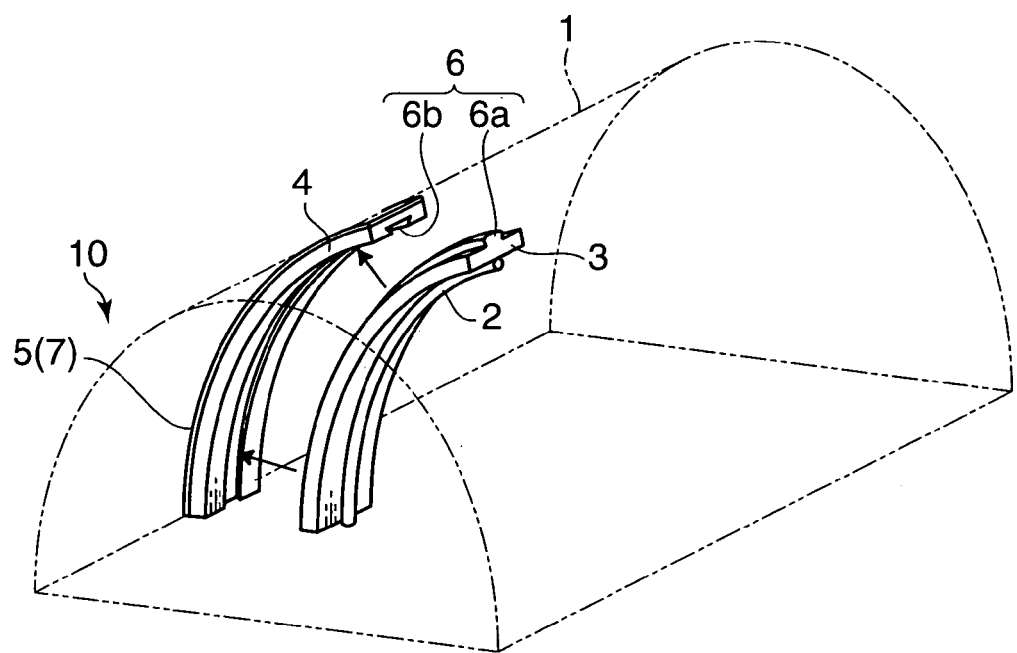
FIG. 2 is a perspective view showing the attachment of the optical fiber measuring module according to the first embodiment of the invention to a structure.

With reference to FIGS. 1 and 2, a shown optical fiber measuring module 10 according to the first embodiment of the present invention measures at least one physical quantity of the distortion and the temperature of the structure 1 by laying an optical fiber cable 2 on a structure 1. In order to enable the optical fiber measuring module 10 to be attached to the structure 1 without influencing the optical fiber cable 2 which requires a careful attention, a base member 3 for holding the optical fiber cable 2 and an attachment member 4 for attaching this base member 3 to the structure 1 are provided.

In order to attach the attachment member 4 to the structure 1 without working the structure 1 and the attachment member 4 every time, an attaching device 5 is provided between the attachment member 4 and the structure 1, so that the attachment member 4 can be easily attached to the structure 1. In order to enable the optical fiber measuring module 10 to be attached to the structure 1 by successively locking the base member in the attachment member 4 with the attachment member 4 attached to the structure 1, a locking device 6 is provided between the base member 3 and the attachment member 4, so that the base member 3 can be easily locked in the attachment member 4.

The optical fiber cable 2 is adapted to measure the distortion, the temperature and other physical quantity of the optical fiber cable 2 by causing a discontinuous pump light such as a laser beam to be incident thereon to create a scattered light resulting from the distortion, the temperature and the like of the optical fiber cable such as Brillouin scattering or Raman scattering and by detecting the scattered light. The optical fiber cable 2 includes an optical fiber core 2a, a cladding 2b, and a covering layer 2c.

The base member 3 is for holding the optical fiber cable 2, made of a plate material having a certain degree of flexibility such as a metallic thin plate or a synthetic resin plate, and so formed as to be attachable to structures 1 of various shapes via the attachment member 4.

The attachment member 4 is provided to attach the base member 3 to the structure 1. Likewise, the attachment member 4 is made of a plate material having a certain degree of flexibility such as a metallic thin plate or a synthetic resin plate and so formed as to be attachable to structures 1 of various shapes via the attachment member 4.

The attaching device 5 includes an adhering layer 7 provided on the attachment member 4 and made of an adhesive or a welding agent for adhering the attachment member 4 and the structure 1 in the first embodiment in order to enable the attachment member 4 to be attached to the structure 1 without damaging the optical fiber cable 2. Thus, the attachment member 4 can be attached to the structure 1 without considering the optical fiber cable 2.

The locking device 6 is constructed such that a locking portion 6a provided in the attachment member 4 is engaged with an engaging portion 6b of the base member 6b to lock the base member 3 in the attachment member 4 in order to enable the base member to be attached to the attachment member 4 in one operation without requiring any part for attachment such as screws.

The functions of the optical fiber measuring module 10 according to the first embodiment are described. Since this optical fiber measuring module 10 is provided with the base member 3 for holding the optical fiber cable 2, the base member 3 can be handled upon handling the optical fiber measuring module and the optical fiber cable 2 requiring a careful attention need not be directly handled. Further, since the attachment member 4 for attaching the base member 3 to the structure 1 is provided, the optical fiber measuring module 1 can be easily attached without influencing the optical fiber cable 2.

Since the attaching device 5 for attaching the attachment member 4 to the structure 1 is provided between the attachment member 4 and the structure 1 in the optical fiber measuring module 10, the attachment member 4 can be easily attached to the structure 1 every time.

Further, since the locking device 6 for locking the base member 3 in the attachment member 4 is provided between the base member 3 and the attachment member 4, the optical fiber measuring module 1 can be easily attached to the structure 1 by successively locking the base member 3 in the attachment member 4 with the attachment member 4 attached to the structure 1.

Particularly, in this optical fiber measuring module 10, the attachment member 4 is attached to the structure 1 by means of the attaching device 5 provided at the attachment member 4 and including the adhering layer 7 made of an adhesive or welding agent for adhering the attachment member 4 and the structure 1. Thus, the attachment member 4 can be easily attached to the structure 1 in one operation without requiring any part for attachment such as screws.

Furthermore, since the base member 3 is locked in the attachment member 4 by the locking device 6 for engaging the locking portion 6a provided in the attachment member 4 with the engaging portion 6b provided on the base member 3 in this optical fiber measuring module 10, the base member 3 can be easily attached to the attachment member 4 in one operation without requiring any part for attachment such as screws.

Figure 3:
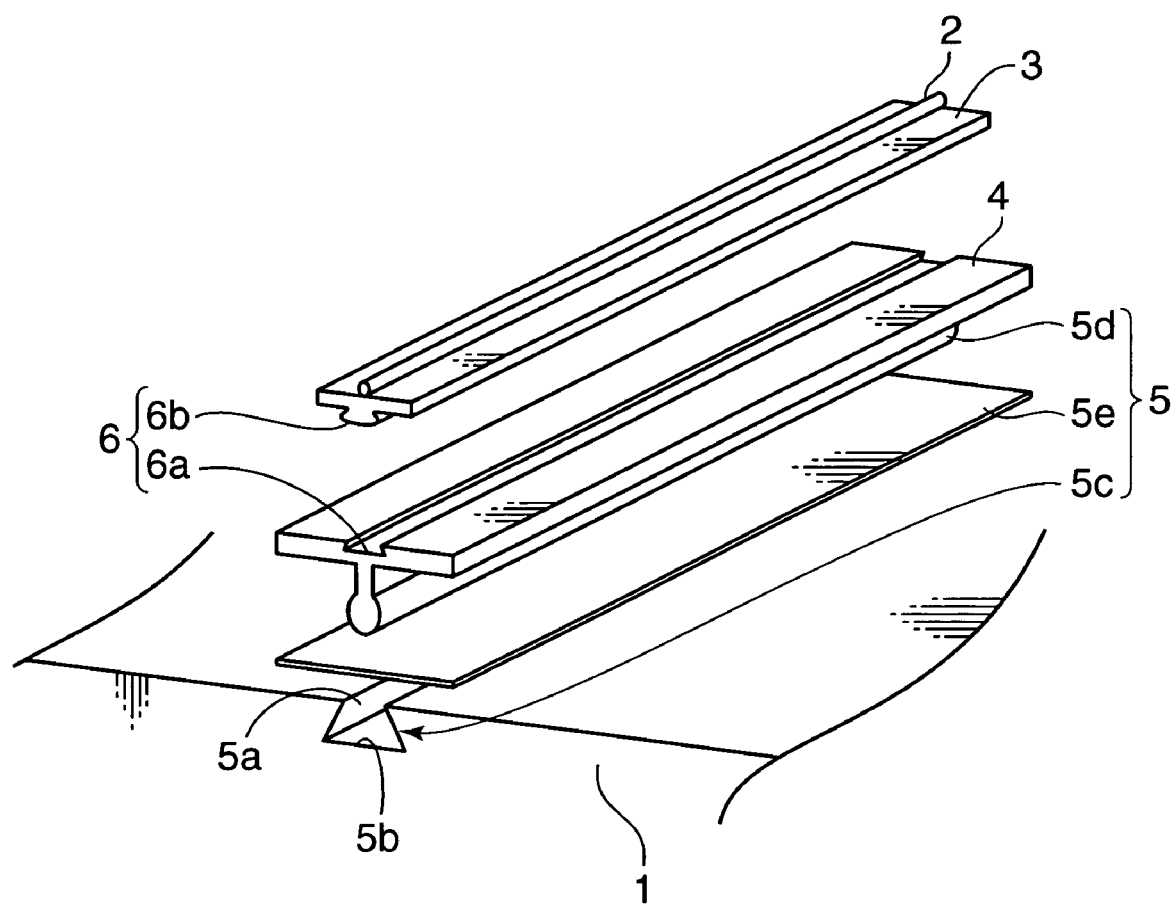
FIG. 3 is a perspective view showing a construction of an optical fiber measuring module according to a second embodiment of the invention.

Next, a second embodiment of the present invention is described with reference to FIG. 3. FIG. 3 is a perspective view showing a construction of an optical fiber measuring module 20 according to the second embodiment of the invention.

With reference to FIG. 3, in the optical fiber measuring module 20 of the second embodiment, the attaching device 5 includes a bottomed locking groove 5c formed in the structure 1 and narrower at an opening 5a than at a bottom portion 5b, an engaging projection 5d provided on the attachment member 4 and engageable with the locking groove 5c and a resilient sheet 5e made of a resilient member in order to enable the attachment member 4 to be easily attached to the structure 1 in one operation. The attachment member 4 is attached to the structure 1 by pushing the engaging projection 5d into the locking groove 5c via the resilient sheet 5e.

The functions of the optical fiber measuring module 20 according to the second embodiment are described. Since the attachment member 4 can be attached to the structure 1 by the attaching device 5 of pushing the engaging projection 5d provided on the attachment member 4 into the bottomed locking groove 5c via the resilient sheet 5e in this optical fiber measuring module 20, the attachment member 4 can be easily attached to the structure 1 in one operation without requiring any part for attachment such as screws.

Further, since the base member 3 is locked in the attachment member 4 by the locking device 6 of engaging the locking portion 6a provided in the attachment member 4 with the engaging portion 6b provided on the base member 3 in this optical fiber measuring module 20, the base member 3 can be easily attached to the attachment member 4 in one operation without requiring any part for attachment such as screws.

Figure 4A:
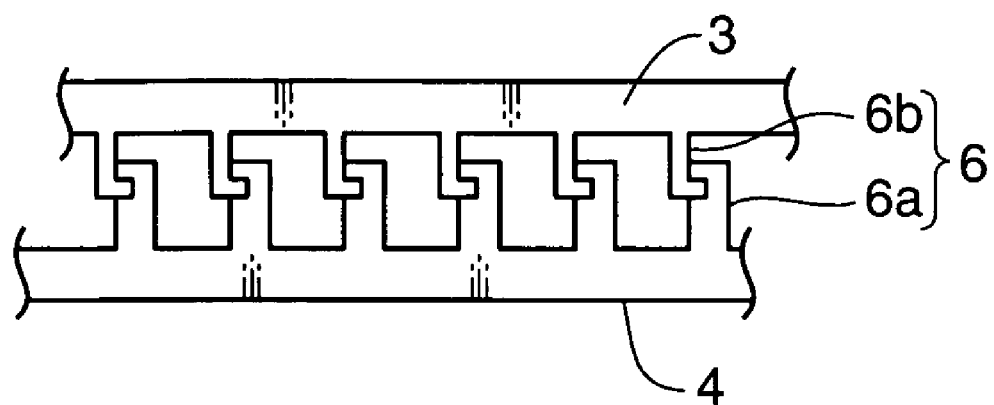
Figure 4B:
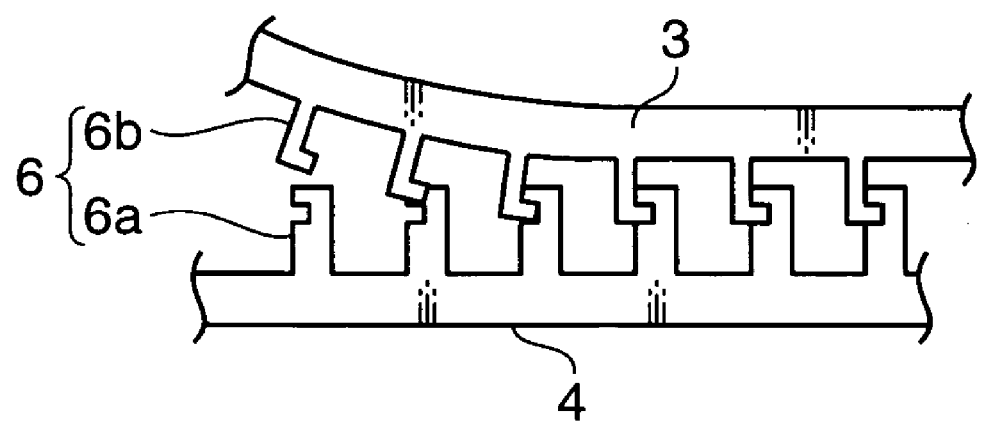

FIGS. 4A and 4B show a modification of the locking device 6 of the optical fiber measuring module according to the second embodiment of the present invention, wherein FIG. 4A shows a state where the base member 3 is attached to the attachment member 4 by the locking device 6 and FIG. 4B shows an intermediate state during the detachment of the base member 3 from the attachment member 4.

With reference to FIGS. 4A and 4B, in this modification, the locking device 6 has a zipper structure in which locking portions 6a provided on the attachment member 4 are formed into hooks and engaging portions 6b provided on the base member 3 are formed into hooks engageable with the hooked locking portions 6a in order to enable the base member 3 to be attached to the attachment member 4 in one operation. By taking the zipper structure, the locking device 6 of this modification can detachably lock the base member 3 in the attachment member 4 by successively engaging the locking device 6 from one end thereof.

The functions of the locking device 6 according to this modification are described. In this modification, by the locking device 6 having such a zipper structure as to engage the hooked engaging portions 6b provided on the base member 3 with the hooked locking portions 6a provided on the attachment member 3, the base member 3 is detachably locked in the attachment member 4 by successively engaging the engaging portions 6b with the locking portions 6a from one end of the locking device 6. Thus, the base member 3 can be fairly easily attached to the attachment member 4.

Since the locking device 6 has the zipper structure as above, the engaging portions 6b can be successively engaged with and disengaged from the locking portions 6a from one end of the locking device 6. As a result, the base member 3 can be detachably attached to the attachment member 4 in one operation.

Figure 5A:
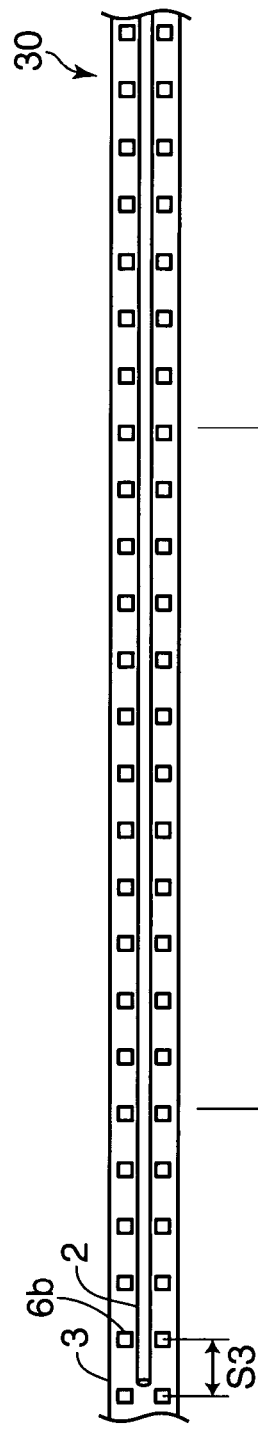
Figure 5B:
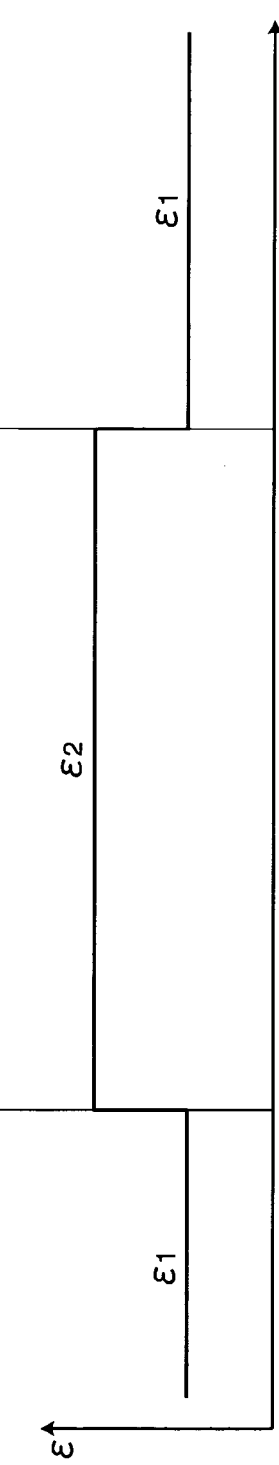
Figure 5C:
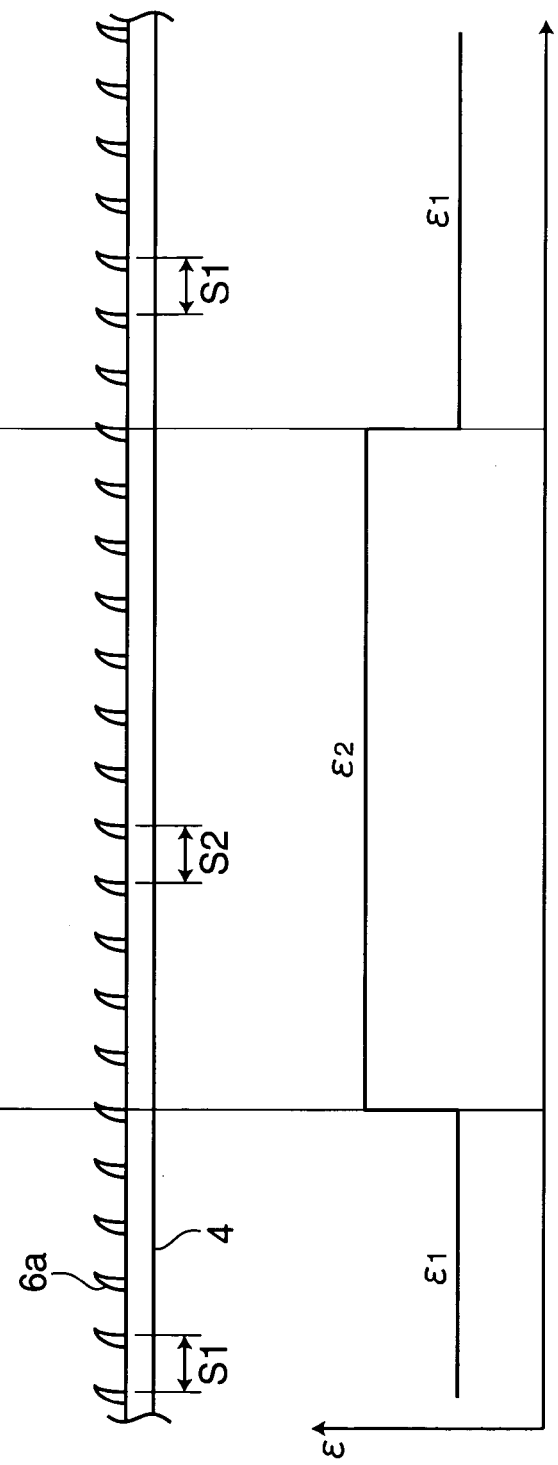

Next, a third embodiment of the present invention is described with reference to FIGS. 5A to 5C. FIGS. 5A, 5B and 5C are diagrams showing a construction of an optical fiber measuring module 30 according to the third embodiment of the invention, wherein FIG. 5A is a plan view showing the construction of the optical fiber measuring module 30 according to the third embodiment, FIG. 5B is a side view of the attachment member 4, and FIG. 5C is a graph showing the intensity of a distortion acting on the optical fiber cable 2 after the base member 3 is attached to the attachment member 4.

With reference to FIGS. 5A to 5C, in the optical fiber measuring module 30 of the third embodiment, the locking device 6 is constructed such that intervals S1, S2 between the locking portions 6a provided on the attachment member 4 and intervals S3 between the engaging portions 6b provided in the attachment member 4 are differed to give a distortion to the base member 3 locked in the attachment member 4 to elongate or contract the base member 3, thereby setting an initial distortion of the optical fiber cable 2.

The functions of the optical fiber measuring module 30 according to the first embodiment are described. In this optical fiber measuring module 30, since a distortion can be given to the base member 3 locked in the attachment member 4 to elongate or contract the base member 3 by differing the intervals S1, S2 between the locking portions 6a provided on the attachment member 4 and the intervals S3 between the engaging portions 6b provided in the base member 3, the initial distortion of the optical fiber cable 2 can be set. As a result, a measurement range of the optical fiber measuring module 30 can be properly set.

Figure 6:
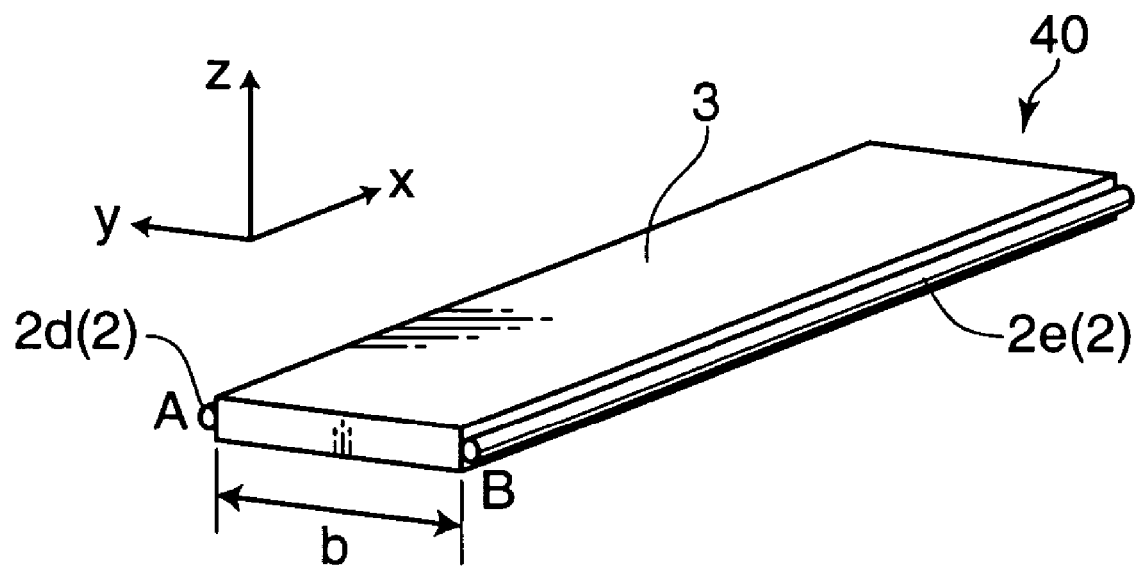
FIG. 6 is a perspective view showing a construction of an optical fiber measuring module according to a fourth embodiment of the invention.

Next, a fourth embodiment of the present invention is described with reference to FIG. 6. FIG. 6 is a perspective view showing a construction of an optical fiber measuring module 40 according to the fourth embodiment of the invention.

With reference to FIG. 6, in the optical fiber measuring module 40 of the fourth embodiment, the base member 3 holds two optical fiber cables 2 at a specified distance from each other, whereby at least one state quantity of the elongation, bending, and partial lateral pressure of the structure on which the optical fiber measuring module is laid can be measured from measurement values of the distortions of the two optical fiber cables 2 and increasing/decreasing patterns of the measurement values.

Particularly in the fourth embodiment, the base member 3 is strip-shaped and so constructed as to hold the two optical fiber cables 2 along the longitudinal direction of the base member 3 at a specified distance from each other in order to enable the efficient measurement of state quantities of the structure 1 such as the planar deformation and distortion thereof in a remote place by a simple construction.

The functions of the optical fiber measuring module 40 according to the fourth embodiment are described. Since the base member 3 holds the two optical fiber cables 2d, 2e at a specified distance from each other in this optical fiber measuring module 40, at least one state quantity of the elongation, bending, and partial lateral pressure of the structure on which the optical fiber measuring module is laid can be measured from the measurement values of the distortions of the two optical fiber cables 2 and the increasing/decreasing patterns of the measurement values. As a result, the state quantities of the structure 1 such as the deformation and distortion thereof can be efficiently measured in a remote place.

Particularly in this embodiment, the two optical fiber cables 2d, 2e are held along the longitudinal direction of the strip-shaped base member 3 at the specified distance from each other. Thus, the state quantities of the structure 1 such as the planar deformation and distortion thereof can be efficiently measured in a remote place by the simple construction.

Figures 7A, 7B:
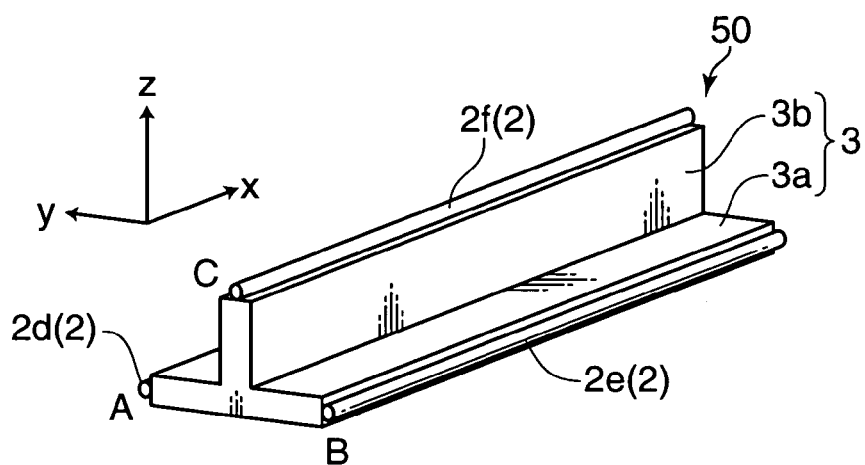

Next, a fifth embodiment of the present invention is described with reference to FIGS. 7A and 7B. FIGS. 7A and 7B are diagrams showing a construction of an optical fiber measuring module 50 according to the fifth embodiment of the invention, wherein FIG. 7A is a perspective view of the optical fiber measuring module 50 and FIG. 7B is a table showing effects of the optical fiber measuring module 50.

With reference to FIG. 7A, in the optical fiber measuring module 50 of the fifth embodiment, the base member 3 includes a strip-shaped flat portion 3a and a wall portion 3b standing substantially upright substantially in the middle of the flat portion 3a, two optical fiber cables 2d, 2e are held along the longitudinal direction of the flat portion 3a at a specified distance from each other, and another optical fiber 2f is held along the longitudinal direction of the wall portion 3b.

The functions of the optical fiber measuring module 50 according to the fifth embodiment are described. In this optical fiber measuring module 50, the two optical fibers cables 2d, 2e are held along the longitudinal direction of the strip-shaped flat portion 3a at the specified distance from each other, and one more optical fiber cable 2f is held along the longitudinal direction of the wall portion 3b standing substantially upright, thereby three-dimensionally arranging the optical fiber cables 2. Thus, state quantities of the structure 1 such as the planar deformation and distortion thereof can be efficiently measured in a remote place by a simple construction.

Particularly, with reference to FIG. 7B, in this optical fiber measuring module 50, the elongative distortions of the fiber cables 2d, 2e and 2f are respectively observed as (+) if an elongation of x-axis acts on the center axis of the base member 3; only the elongative distortion of the fiber cable 2f is observed as (+) if a lateral pressure acts on a portion C in z-axis direction; and the elongative distortion of the fiber cable 2d is observed as (+) while that of the fiber cable 2e is observed as (−) if a bending force acts about z-axis. Thus, the cause of the distortion such as the elongation along the center axis of the base member 3, the action of the lateral pressure or the action of the bending force can be analyzed by analyzing such a distortion pattern of the fiber cables 2d, 2e, 2f.

Figure 8:
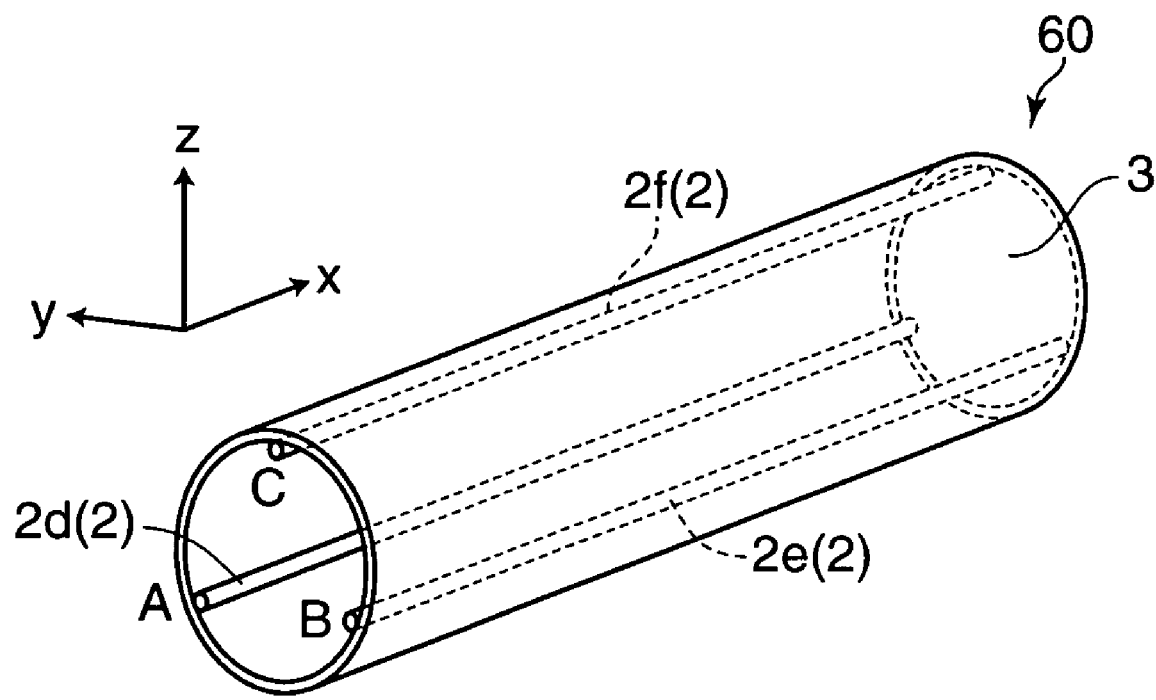
FIG. 8 is a perspective view showing a construction of an optical fiber measuring module according to a sixth embodiment of the invention.

Next, a sixth embodiment of the present invention is described with reference to FIG. 8. FIG. 8 is a perspective view showing a construction of an optical fiber measuring module 60 according to the sixth embodiment of the invention.

With reference to FIG. 8, in the optical fiber measuring module 60 of the sixth embodiment, the base member 3 is formed into a tube in order to enable measurements of state quantities such as the three-dimensional deformation and distortion of the structure 1, and three optical fiber cables 2d, 2e, 2f are held along the longitudinal direction of the inner wall of this tubular base member 3 at specified distances from each other.

The functions of the optical fiber measuring module 60 according to the sixth embodiment are described. Since the three optical fiber cables 2d, 2e, 2f are held along the longitudinal direction of the inner wall of this tubular base member 3 at the specified distances from each other to be three-dimensionally arranged in this optical fiber measuring module 60, state quantities of the structure 1 such as the three-dimensional deformation and distortion thereof can be efficiently measured in a remote plate by a simple construction.

Similar to the optical fiber measuring module 50 of the fifth embodiment, the optical fiber measuring module 60 of the sixth embodiment has the effect that the elongation, lateral pressure, bending force and the like acting on the base member 3 can be analyzed by analyzing the distortion pattern of the fiber cables 2d, 2e, 2f as shown in FIG. 7B.

Figure 9:
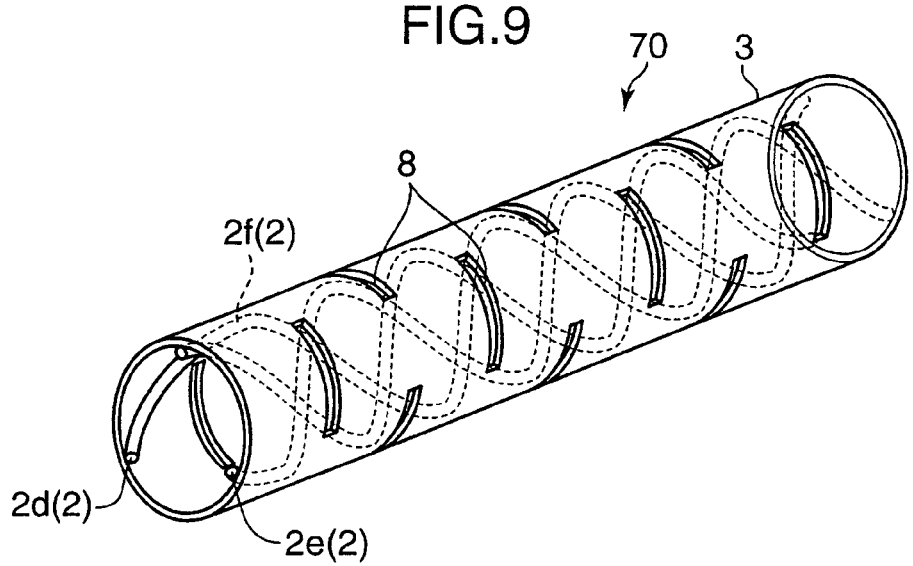
FIG. 9 is a perspective view showing a construction of an optical fiber measuring module according to a seventh embodiment of the invention.

Next, a seventh embodiment of the present invention is described with reference to FIG. 9. FIG. 9 is a perspective view showing a construction of an optical fiber measuring module 70 according to the seventh embodiment of the invention.

With reference to FIG. 9, in the optical fiber measuring module 70 of the seventh embodiment, optical fiber cables 2d, 2e, 2f are spirally held on the inner wall of the tubular base member 3 in order to make the optical fiber measuring module 70 difficult to break upon the deformation of the base member 3 by making distortions acting in the longitudinal directions of the optical fiber cables 2d, 2e, 2f in response to a longitudinal deformation of the tubular base member 3 relatively smaller.

Further, in an optical fiber measuring module 70, the base member 3 is formed with slits 8 for enhancing the flexibility of the base member 3 in such a manner as to avoid the held optical fiber cables 2d, 2e, 2f in order to make the base member 3 applicable to structures 1 of various shapes such as the structure 1 of such as a shape as to have a curvature.

The functions of the optical fiber measuring module 70 according to the seventh embodiment are described. Since the optical fiber cables 2d, 2e, 2f are spirally held on the inner wall of the tubular base member 3 in this optical fiber measuring module 70, distortions acting in the longitudinal directions of the optical fiber cables 2d, 2e, 2f in response to the longitudinal direction of the base member 3 can be made relatively smaller. As a result, the optical fiber measuring module 70 can be made more difficult to break upon the deformation of the base member 3.

Further, since the slits 8 for enhancing the flexibility of the base member 3 are so formed in the base member 3 as to avoid the held optical fiber cables 2d, 2e, 2f in the optical fiber measuring module 70, they restrict a maximum resilient bending curvature of the base member 3. As a result, the optical fiber measuring module can be made highly safe by preventing the leak of the light in light conducting paths of the optical fiber cables 2d, 2e, 2f.

Figure 10:
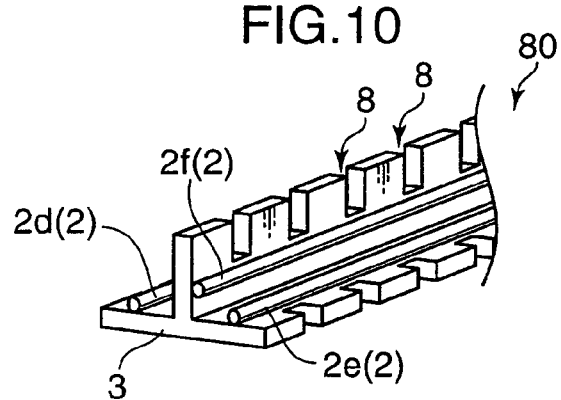
FIG. 10 is a perspective view showing a construction of an optical fiber measuring module according to an eighth embodiment of the invention.
Figure 11:
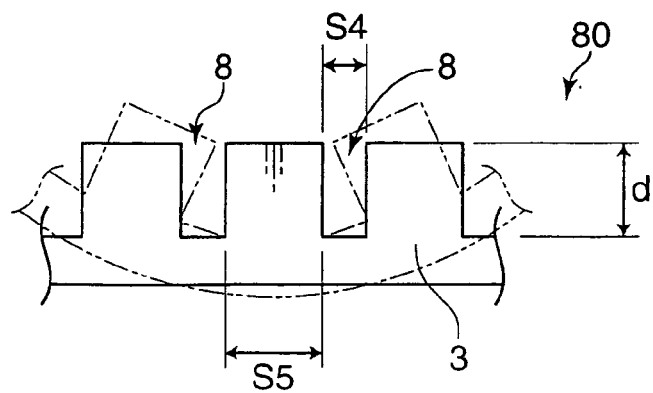
FIG. 11 is a section showing the action of the optical fiber measuring module according to the eight embodiment of the invention.

Next, an eighth embodiment of the present invention is described with reference to FIGS. 10 and 11. FIG. 10 is a perspective view showing a construction of the optical fiber measuring module 80 according to the eighth embodiment of the invention, and FIG. 11 is a section showing the action of the optical fiber measuring module 80 according to the eighth embodiment of the invention.

With reference to FIG. 10, in the optical fiber measuring module 80 of the eighth embodiment, the base member 3 includes a strip-shaped flat portion 3a and a wall portion 3b standing substantially upright substantially in the middle of the flat portion 3a, two optical fiber cables 2d, 2e are held along the longitudinal direction of the flat portion 3a at a specified distance from each other, and another optical fiber 2f is held along the longitudinal direction of the wall portion 3b in order to enable measurements of state quantities of the structure 1 such as the three-dimensional deformation and distortion thereof. Further, slits 8 for enhancing the flexibility of the base member 3 are so formed in the strip-shaped flat portion 3a and the wall portion 3b of the base member 3 as to avoid the held optical fiber cables 2d, 2e, 2f.

Here, the functions of the optical fiber measuring module 80 of the eighth embodiment are described. With reference to FIG. 11, in this optical fiber measuring module 80, a maximum bending angle is S/4d rad. and a minimum circle diameter is 2(S4+S5)d/S4 if intervals between the slits 8 are S5 and the width and height of the slits 8 are S4 and d. Thus, a light loss caused by an excessive bending can be avoided by determining the factors of the slits 8 such that the maximum bending angle does not exceed a permissible bending angle of the optical fiber cables 2.

As described above, in this optical fiber measuring module 80 of the eighth embodiment, the slits 8 for enhancing the flexibility of the base member 3 are so formed in the base member 3 as to avoid the held optical fiber cables 2d, 2e, 2f and the deformations of the optical fiber cables 2d, 2e, 2f in response to an excessive deformation of the structure 1 can be made not to exceed the permissible value. Thus, the optical fiber measuring module 80 can be made highly versatile and applicable in a wide range of structures 1 including those expected to experience large deformations.

Figure 12:
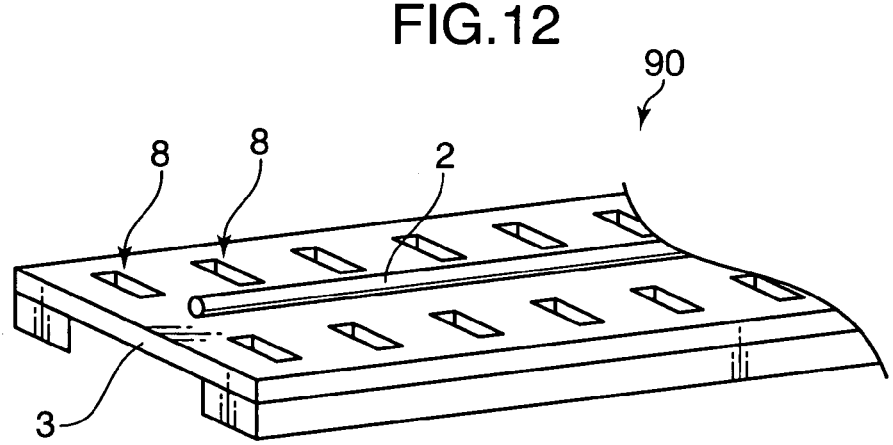
FIG. 12 is a perspective view showing a construction of an optical fiber measuring module according to a ninth embodiment of the invention.

Next, a ninth embodiment of the present invention is described with reference to FIG. 12. FIG. 12 is a perspective view showing a construction of an optical fiber measuring module 90 according to the ninth embodiment of the invention.

With reference to FIG. 12, in the optical fiber measuring module 90 of the ninth embodiment, the base member 3 is strip-shaped in order to enable state quantities of the structure such as the deformation and distortion thereof to be efficiently measured in a remote place by a simple construction, and one optical fiber cable 2 is held along the longitudinal direction of the base member 3. Further, slits 8 for enhancing the flexibility of the base member 3 is so formed in the base member 3 as to avoid the held optical fiber cable 2 lest the deformation of the optical fiber cable 2 should exceed a permissible value.

The functions of the optical fiber measuring module 90 according to the ninth embodiment are described. Since the base member 3 is formed with the slits 8 for alleviating the elongation of the base member 3 in this optical fiber measuring module 90, the deformation of the optical fiber cable 2 in response to an excessive deformation of the structure 1 on which the optical fiber measuring module 90 is laid can be made not to exceed the permissible value. As a result, the optical fiber measuring module 90 can be made highly versatile and applicable in a wide range of structures 1 including those expected to experience large deformations.

Figure 13:
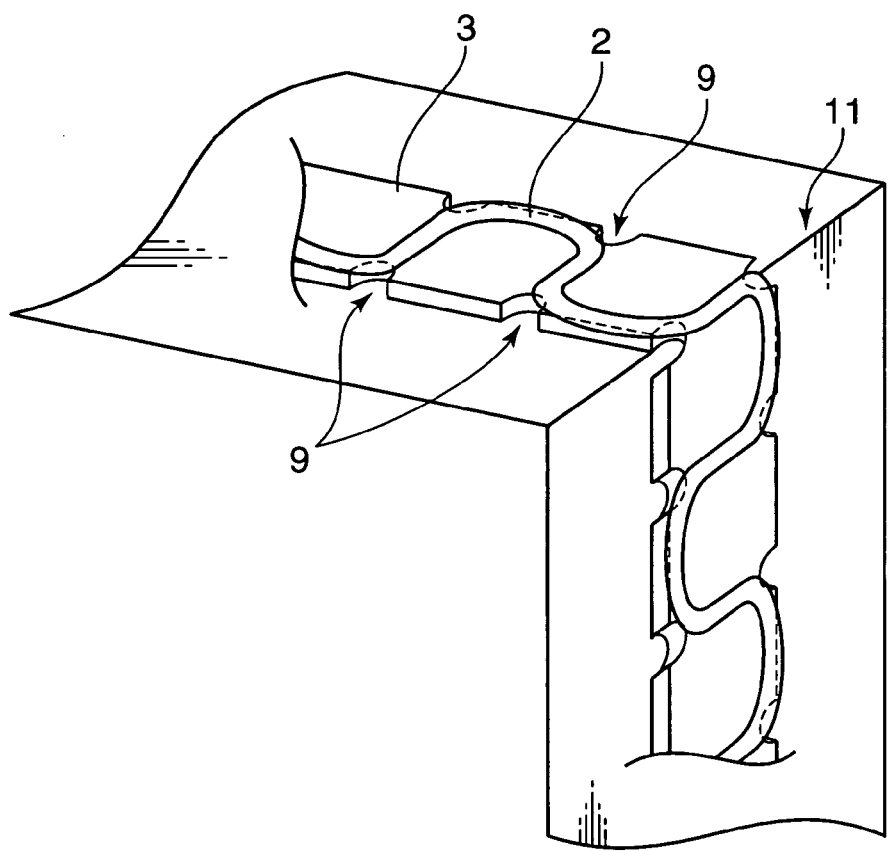
FIG. 13 is a perspective view showing a construction of an optical fiber measuring module according to a tenth embodiment of the invention.

Next, a tenth embodiment of the present invention is described with reference to FIG. 13. FIG. 13 is a perspective view showing a construction of an optical fiber measuring module 100 according to the tenth embodiment of the invention.

With reference to FIG. 13, in the optical fiber measuring module 100 of the tenth embodiment, the optical fiber cable 2 is held on the base member 3 in a wavy manner, notches 9 used to bend the base member 3 are formed at lateral ends of the base member 3 located on extensions of tangents to the optical fiber cable 2 extending from peaks of waves to troughs thereof, and the base member 3 is bent along these notches 9 and the optical fiber cable 3.

The functions of the optical fiber measuring module 100 according to the tenth embodiment are described. In this optical fiber measuring module 100, the base member 3 can be bent along the optical fiber cable 2 while the optical fiber cable 2 is only twisted at a bending position determined by the notches 9. Thus, the optical fiber measuring module 100 can be placed at a corner portion 11 of the structure 1.

Figure 14:
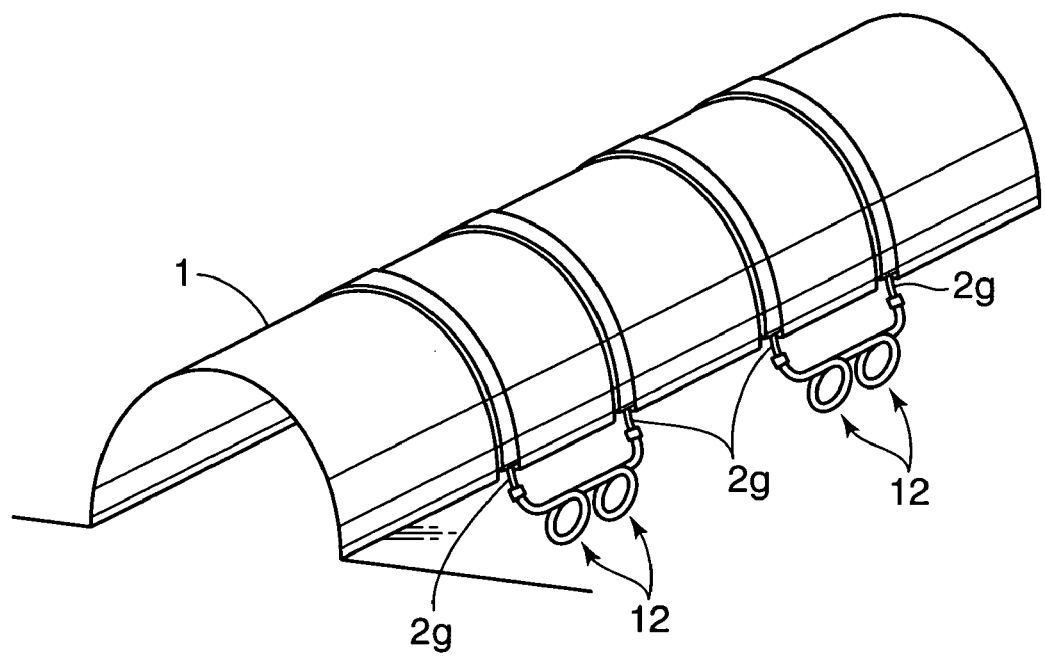
FIG. 14 is a perspective view showing a construction of an optical fiber measuring module according to an eleventh embodiment of the invention.
Figure 15:
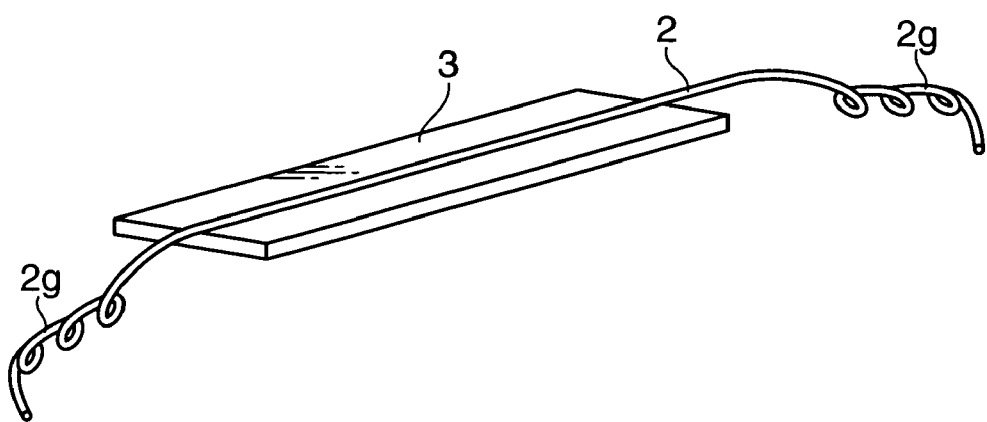
FIG. 15 is a perspective view showing a construction of a unit of the optical fiber measuring module according to the eleventh embodiment of the invention.
Figure 16:
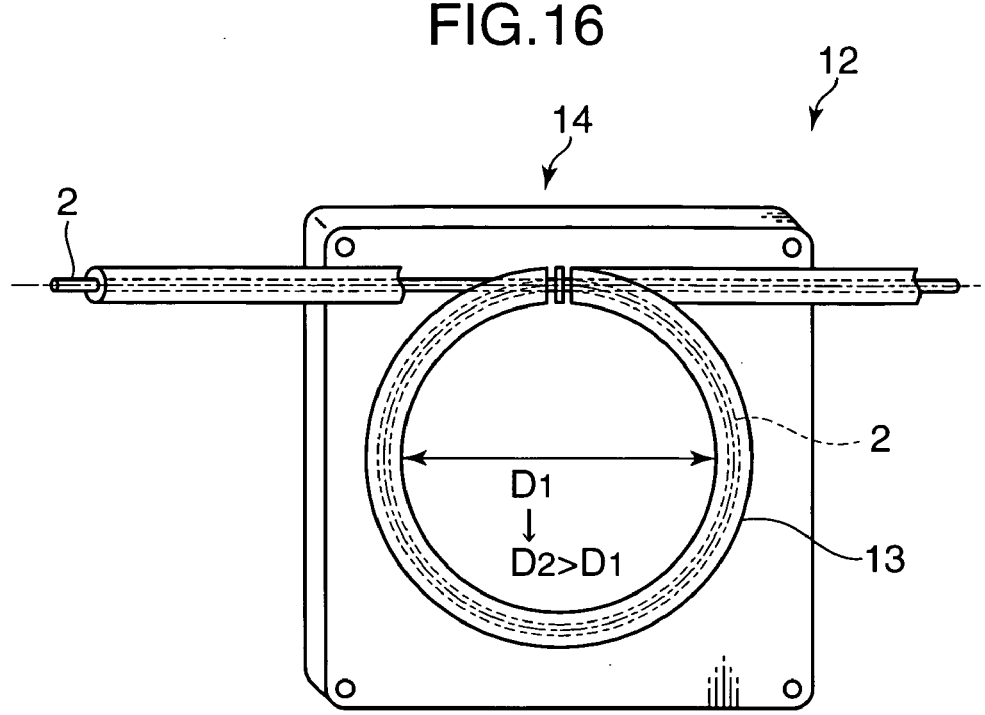
FIG. 16 is a perspective view showing a construction of a polarizing ring of the optical fiber measuring module according to the eleventh embodiment of the invention.
Figure 17A:
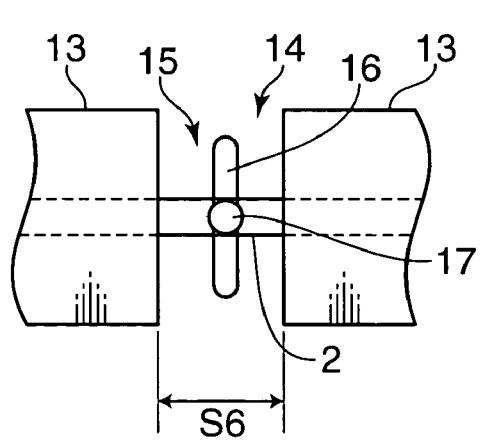
Figure 17B:
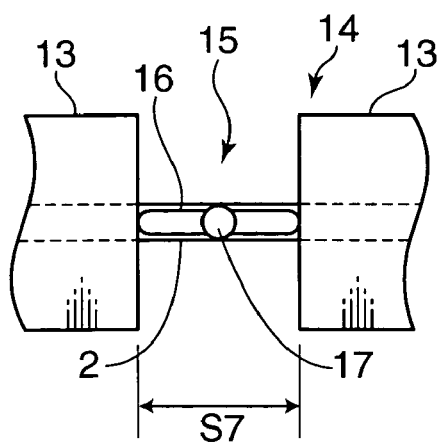

Next, an eleventh embodiment of the present invention is described with reference to FIGS. 14 to 17. FIG. 14 is a perspective view showing a construction of an optical fiber measuring module 110 according to the eleventh embodiment of the invention; FIG. 15 is a perspective view showing a construction of a unit of the optical fiber measuring module 110 according to the eleventh embodiment of the invention; FIG. 16 is a perspective view showing a construction of a polarizing ring 12 of the optical fiber measuring module 110 according to the eleventh embodiment of the invention; and FIGS. 17A and 17B are side views showing a construction of a loading mechanism 14 for the polarizing ring 12, wherein FIG. 17A shows a state where the length of a discontinuous portion 15 is not changed by a loading member 16 and FIG. 17B shows a state where the length of the discontinuous portion 15 is changed by the loading member 16.

With reference to FIGS. 14 and 15, the optical fiber measuring module 110 of the eleventh embodiment is provided with the base members 3 having a standardized length and coupling portions 2g of the optical fiber 2 located at the opposite ends of these standardized base members 3, and the coupling portions 2d of the optical fiber cable 2 are optically coupled to each other to successively connect the base members 3, whereby the optical fiber measuring module 110 can deal with structures 1 having different sizes.

Further, in the optical fiber measuring module 110 of the eleventh embodiment, the optical fiber cables 2 are looped to provide the polarizing rings 12, which correct polarized states of signal lights propagating in the optical fiber cables 2.

The polarizing ring 12 is formed by looping the optical fiber cable 2 of a SM (single mode) and provided with a ring base member 13 for holding the optical fiber cable 2 forming the polarizing ring 12 and a loading mechanism 14 capable of giving a distortion in a circumferential direction of the ring base member 13. The optical fiber cable 2 held in the ring base member 13 is distorted to correct the distortion by giving the distortion in the circumferential direction of the ring base member 13 by means of this loading mechanism 14.

As shown in FIG. 17A, the loading mechanism 14 includes a discontinuous portion 15 formed in the ring base member 13, a loading member 16 held in contact with the opposite ends of the ring base member 13 facing the discontinuous portion 15, and a loading-member shaft 17 provided substantially in the center of the loading member 16 and rotatably supporting the loading member 16. The length of the discontinuous portion 15 of the ring base member 13 is changed by turning the loading member 16 about the loading-member shaft 17 as shown in FIG. 17B, thereby changing the distortion to the ring base member 13.

With reference to FIGS. 14 to 17, the functions of the optical fiber measuring module 110 of the eleventh embodiment are described. This optical fiber measuring module 110 is provided with the base member 3 having a standardized length and the coupling portions 2g of the optical fiber cable 2 provided at the opposite ends of each base member 3. Since the coupling portions 2d of the optical fiber cables 2 are optically coupled to each other to successively connect the base members 3, the optical fiber measuring module 110 can deal with differently dimensioned structures 1, thereby being made more versatile.

Further, the optical fiber measuring module 110 of the eleventh embodiment can conduct a precise measurement since the polarized state of the signal light propagating in the optical fiber cable 2 can be corrected by the polarizing ring 12 formed by looping the optical fiber cable 2.

In the optical fiber measuring module 110 of the eleventh embodiment, a distortion is given in the circumferential direction of the ring base member 13 by the loading mechanism 14 capable of giving the distortion in the circumferential direction of the ring base member 13 holding the optical fiber cable forming the polarizing ring 12, whereby the optical fiber cable 2 held in the ring base member 13 can be distorted to correct the distortion of the optical fiber measuring module. Thus, the optical fiber measuring module 110 can conduct a more precise measurement.

Further, in the optical fiber measuring module 110 of the eleventh embodiment, the distortion of the optical fiber measuring module can be easily corrected by a simple construction of changing the length of the discontinuous portion 15 of the ring member 13 to change the distortion of the ring base member 13 by turning the loading member 16 in contact with the opposite ends of the ring base member 13 facing the discontinuous portion 15 of the loading mechanism 14 about the loading-member shaft 17 provided substantially in the center of the loading member 16.

The aforementioned embodiments are merely the illustrations of preferred specific examples and the present invention is not limited thereto.

For example, the optical fiber cable 2 is not necessarily held on the base member 3 in a straight, wavy or spiral manner as shown, and various design changes can be made on the holding mode of the optical fiber cable 2.

Further, the shape of the base member 3 is not necessarily restricted to the strip shape, plate shape or tubular shape as shown, and various design changes can be made thereon provided that the base member 3 has a shape capable of holding the optical fiber cable 2.

Figure 18A:
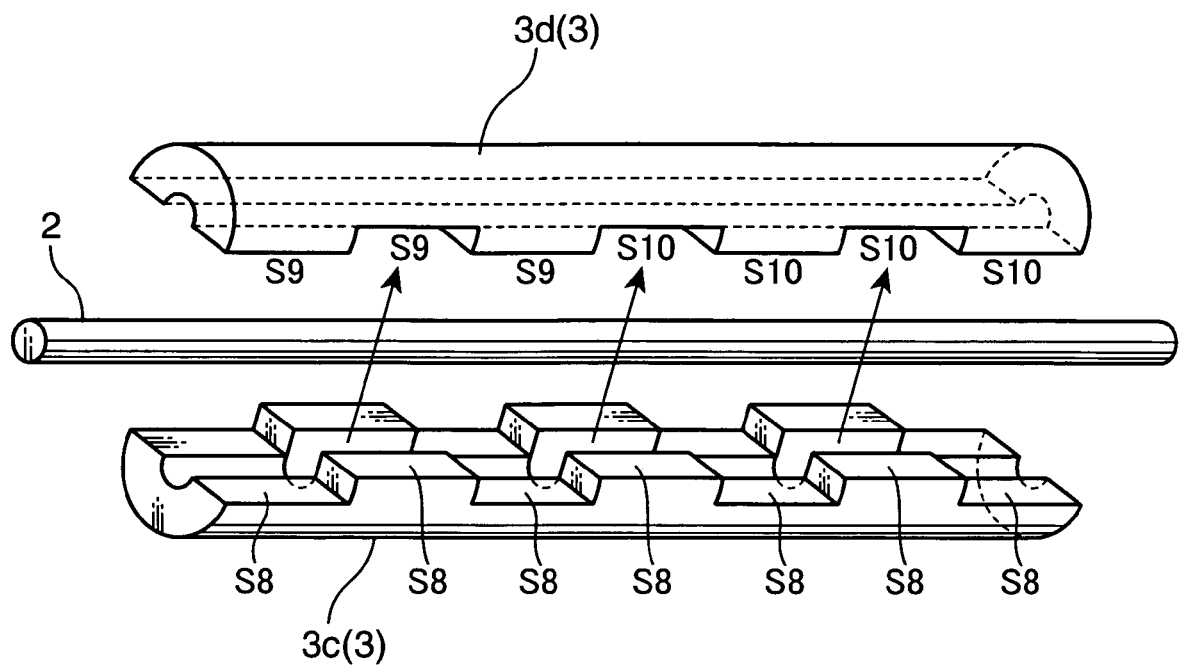
Figure 18B:

For example, FIGS. 18A and 18B show a modification of the base member 3, wherein FIG. 18A is a perspective view of this modification and FIG. 18B is a graph of the distortion of the optical fiber cable 2 showing an effect of this modification.

With reference to FIG. 18A, the base member 3 may be formed into two semicylindrical members 3c, 3d for holding the optical fiber cable 2 in the middle. Particularly, recesses and projections are formed at intervals S8 in one semicylindrical member 3c shown in FIG. 18A, whereas recesses and projections are formed at intervals S9 and S10 slightly different from the intervals S8 in the other semicylindrical member 3d. These two semicylindrical members 3c, 3d are engaged with each other and the optical fiber cable 2 is adhered to the one semicylindrical member 3c. Thus, as shown in FIG. 18B, the optical fiber cable 2 can be held while giving different distortions: distortion $\epsilon 3=(S9-S8)/S8$ in areas engaged at the intervals S9 and distortion $\epsilon 4=(S10-S8)/S8$ in areas engaged at the intervals S10, to the optical fiber cable 2 along the longitudinal direction of the optical fiber cable 2.

Further, the shape of the attachment member 4 is not necessarily restricted to the plate shape as shown, and various design changes can be made thereon provided that the attachment member 4 is so shaped as to be able to attach the base member 2 to the structure 1.

Furthermore, the attaching device 5 is not restricted to the adhering layer 7 made of an adhesive or a welding agent or a combination of the bottomed locking groove 5c formed in the structure 1 and the engaging projection 5d formed on the attachment member 4 and to be pressed into the locking groove 5c as shown. Various design changes can be made on the attaching device 5.

Further, the shape of the slits 8 for enhancing the flexibility of the base member 3 is not restricted to the shown one. Various design changes can be made thereon provided that the slits 8 are formed to avoid the held optical fiber cable 2 and to enhance the flexibility of the base member 3.

Furthermore, the shape of the loading mechanism 14 of the polarizing ring 12 is not restricted to the shown one. Various design changes can be made thereon provided that the loading mechanism 14 can correct the distortion by giving a distortion in the circumferential direction of the ring base member 13 to distort the optical fiber cable 2 held in the ring base member 13.

As described above, an optical fiber measuring module is to be laid on a structure for measuring at least one physical quantity from the distortion and temperature of the structure. The optical fiber measuring module comprises an optical fiber cable including an optical fiber core, a cladding and a covering layer; a base member for holding the optical fiber cable; and an attachment member for attaching the base member to the structure.

The base member may be handled upon handling the optical fiber measuring module since the base member for holding the optical fiber cable is provided. Thus, it is not necessary to directly handle the optical fiber cable which requires a careful attention. Further, since the attachment member for attaching the base member to the structure is provided, the optical fiber measuring module can be easily attached to the structure without influencing the optical fiber cable.

In a preferred mode, the optical fiber measuring module may further comprise an attaching device provided between the attachment member and the structure for attaching the attachment member to the structure; and a locking device provided between the base member and the attachment member for locking the base member in the attachment member.

According to this preferred mode, since the attaching device for attaching the attachment member to the structure is provided between the attachment member and the structure, the attachment member can be easily attached to the structure without working the structure and attachment member every time. Further, since the locking device for locking the base member in the attachment member is provided between the base member and the attachment member, the optical fiber measuring module can be easily attached to the structure by successively locking the base member in the attachment member with the attachment member attached to the structure.

The attachment member may preferably include an adhering layer provided on the attachment member and made of an adhesive or a welding agent for adhering the attachment member and the structure.

According to this preferred mode, since the attachment member is attached to the structure by the attaching device including the adhering layer provided on the attachment member and made of an adhesive or a welding agent for adhering the attachment member and the structure, the attachment member can be attached to the structure without damaging the optical fiber cable.

The attaching device may preferably attach the attachment member to the structure by pushing an engaging projection engageable with a bottomed locking groove formed in the structure and narrower at an opening than at a bottom portion into the locking groove via a resilient sheet made of a resilient member.

According to this preferred mode, since the attachment member is attached to the structure by the attaching device of pushing the engaging projection provided on the attachment member into the bottomed locking groove narrower at the opening than at the bottom portion via the resilient sheet, the attachment member can be attached to the structure without damaging the optical fiber cable.

The locking device may preferably lock the base member in the attachment member by the engagement of engaging portions provided at the base member with locking portions provided at the attachment member.

According to this preferred mode, since the base member is locked in the attachment member by the locking device of locking the engaging portions provided at the base member in the locking portions provided at the attachment member, the base member can be attached to the attachment member in one operation without requiring any part for attachment such as screws.

The locking device may preferably set an initial distortion of the optical fiber cable for the correction of a zero of a measurement value by differing intervals of the locking portions provided at the attachment member from those of the engaging portions provided at the base member to give a distortion resulting from elongation or contraction to the base member locked in the attachment member.

According to this preferred mode, since the distortion resulting from elongation or contraction can be given to the base member locked in the attachment member by differing the intervals of the locking portions provided at the attachment member and those of the engaging projections provided at the base member, the initial distortion of the optical fiber cable can be set for the correction of the zero of the measurement value. As a result, a spatial position of the optical fiber measuring module can be displayed.

In another preferred mode, the base member may hold two or three optical fiber cables at specified distances from each other, thereby enabling the measurement of at least one state quantity from the elongation, bending and partial lateral pressure of the structure on which the optical fiber measuring module is laid from measurement values of distortions of optical fiber cables and an increasing/decreasing pattern of the measurement values.

According to this preferred mode, the base member holds the two or three optical fiber cables at specified distances from each other, whereby at least one state quantity from the elongation, bending and partial lateral pressure of the structure on which the optical fiber measuring module is laid can be measured from the measurement values of the distortions of the optical fiber cables and the increasing/decreasing pattern of the measurement values. Thus, the state quantities such as the deformation and distortion of the structure can be efficiently measured in a remote place.

In still another preferred mode, the base member may be strip-shaped and hold two optical fiber cables along the longitudinal direction of the base member at a specified distance form each other.

According to this preferred mode, since the two optical fiber cables are held along the longitudinal direction of the strip-shaped base member at the specified distance from each other, the state quantities such as the planar deformation and distortion of the structure can be efficiently measured in a remote place by a simple construction.

In further another preferred mode, the base member may include a strip-shaped flat portion and a wall portion standing substantially upright substantially in the middle of the flat portion. Two optical fiber cables are held along the longitudinal direction of the flat portion at a specified distance from each other, and another optical fiber cable is held along the longitudinal direction of the wall portion.

According to this preferred mode, since the two optical fiber cables are held along the longitudinal direction of the strip-shaped flat portion at the specified distance from each other and another optical fiber cable is held along the longitudinal direction of the wall portion standing substantially upright substantially in the middle of the flat portion, the state quantities such as the three-dimensional deformation and distortion of the structure can be efficiently measured in a remote place by a simple construction.

It may be preferable that the base member is formed to have a tubular shape, and three optical fiber cables are held along the longitudinal direction of the inner wall of the tubular base member at specified distances from each other.

According to this preferred mode, since the three optical fiber cables are held along the longitudinal direction of the inner wall of the tubular base member at the specified distances from each other, the state quantities such as the three-dimensional deformation and distortion of the structure can be efficiently measured in a remote place by a simple construction.

In still another preferred embodiment, the optical fiber cables may be spirally held on the inner wall of the tubular base member.

According to this preferred mode, since the optical fiber cables are spirally held on the inner wall of the tubular base member, distortions acting in the longitudinal directions of the optical fiber cables in response to a longitudinal deformation of the base member can be made relatively smaller. As a result, the optical fiber measuring module can be made difficult to break upon the deformation of the base member.

In further another preferred embodiment, the base member may be formed with slits for enhancing the flexibility of the base member in such a manner as to avoid the held optical fiber cable(s), and the optical fiber measuring module can be so laid as not to exceed a permissible distortion of the optical fiber cable(s) upon being handled.

According to this preferred mode, since the base member is formed with the slits for enhancing the flexibility of the base member in such a manner as to avoid the held optical fiber cable(s) and the optical fiber measuring module can be so laid as not to exceed the permissible distortion of the optical fiber cable(s) upon being handled, the optical fiber measuring module can be made more effective without deteriorating the light transmission of the fiber.

In another preferred embodiment, the base member may be formed with slits for enhancing the flexibility of the base member in such a manner as to avoid the held optical fiber cable(s), whereby the distortion of the optical fiber cable(s) can be prevented from exceeding a permissible value even in response to an excessive deformation of the structure on which the optical fiber measuring module is laid.

According to this preferred mode, the base member is formed with the slits for enhancing the flexibility of the base member in such a manner as to avoid the held optical fiber cable(s), whereby the distortion of the optical fiber cable(s) can be prevented from exceeding the permissible value even in response to the excessive deformation of the structure on which the optical fiber measuring module is laid. Thus, the optical fiber measuring module can be made to have such a high versatility as to be applicable to structures expected to be largely deformed.

In still another preferred embodiment, the base member may hold the optical fiber cable in a wavy manner and be formed with notches used to bend the base member at its lateral ends located on extensions of tangents to the optical fiber cable extending from peaks of waves to troughs thereof, whereby the distortion of the optical fiber cable resulting from bending can be prevented from exceeding a permissible distortion by bending the base member along the notches and the optical fiber cable to cause the optical fiber cable to be only twisted.

According to this preferred mode, the base member holds the optical fiber cable in a wavy manner and is formed with the notches used to bent the base member at its lateral ends located on the extensions of the tangents to the optical fiber cable extending from the peaks of the waves to the troughs thereof, whereby the distortion of the optical fiber cable resulting from bending can be prevented from exceeding the permissible distortion by bending the base member along the notches and the optical fiber cable to cause the optical fiber cable to be only twisted. Thus, the optical fiber measuring module can be made to have such a high versatility as to be applicable to corner portions of structures.

In still another preferred embodiment, the optical fiber measuring module may comprise base members having a standardized length; and coupling portions of the optical fiber cable provided at the opposite ends of each standardized base member, and the coupling portions of the optical fiber cables are optically coupled to each other to successively connect the base members, thereby enabling structures of different sizes to be handled.

According to this preferred mode, the optical fiber measuring module comprises the base members having the standardized length and the coupling portions of the optical fiber cable provided at the opposite ends of each standardized base member, and the coupling portions of the optical fiber cables are optically coupled to each other to successively connect the base members, thereby enabling structures of different sizes to be handled. Thus, the optical fiber measuring module can be made to have an even higher versatility.

In further another preferred embodiment, the optical fiber measuring module may further comprise a polarizing ring formed by looping the optical fiber cable, and a polarized state of a signal light propagating in the optical fiber cable is corrected by the polarizing ring.

According to this preferred mode, precise measurements can be made since the polarized state of the signal light propagating in the optical fiber cable can be corrected by the polarizing ring formed by looping the optical fiber cable.

In another preferred embodiment, the optical fiber measuring module may further comprise a ring base member for holding the optical fiber cable forming the polarizing ring and a loading mechanism capable of giving a distortion in a circumferential direction of the ring base member, and the optical fiber cable held by the ring base member is distorted to correct the distortion by giving the distortion in the circumferential direction of the ring base member by device of the loading mechanism.

According to this preferred mode, the distortion is given in the circumferential direction of the ring base member by the loading mechanism capable of giving the distortion in the circumferential direction of the ring base member holding the optical fiber cable forming the polarizing ring, thereby giving the distortion to the optical fiber cable held by the ring base member to enable the correction of the distortion of the optical fiber measuring module. Thus, more precise measurement can be made.

In still another preferred embodiment, the loading mechanism may include a discontinuous portion provided in the ring base member, a loading member held in contact with the opposite ends of the ring base member facing the discontinuous portion, and a loading-member shaft provided substantially in the center of the loading member and rotatably supporting the loading member, and the length of the discontinuous portion of the ring base member is changed by rotating the loading member about the loading-member shaft, thereby changing the distortion of the ring base member.

According to this preferred embodiment, the loading member held in contact with the opposite ends of the ring base member facing the discontinuous portion is rotated about the loading-member shaft provided substantially in the center of the loading member, whereby the length of the discontinuous portion of the ring base member is changed to change the distortion of the ring member. Thus, the distortion of the optical fiber measuring module can be easily corrected by a simple construction.

As described above, the present invention has a remarkable effect of providing optical fiber measuring modules which can be easily attached to and detached from structures without damaging the optical fiber cores required to be carefully handled.

It should be appreciated that various other design changes can be made without departing from the scope and spirit of the present invention.

What is claimed is:

1. An optical fiber measuring module to be laid on a structure for measuring at least one physical quantity from the distortion and temperature of the structure, comprising:
   an optical fiber cable including an optical fiber core, a cladding and a covering layer,
   a base member for holding the optical fiber cable,
   an attachment member for attaching the base member to the structure,
   an attaching device provided between the attachment member and the structure for attaching the attachment member to the structure, and
   a locking device provided between the base member and the attachment member for locking the base member in the attachment member, wherein the attaching device attaches the attachment member to the structure by pushing an engaging projection engageable with a bottomed locking groove formed in the structure and narrower at an opening than at a bottom portion into the locking groove via a resilient sheet made of a resilient member.

2. An optical fiber measuring module to be laid on a structure for measuring at least one physical quantity from the distortion and temperature of the structure, comprising:
   an optical fiber cable including an optical fiber core, a cladding and a covering layer,
   a base member for holding the optical fiber cable,
   an attachment member for attaching the base member to the structure,
   an attaching device provided between the attachment member and the structure for attaching the attachment member to the structure, and
   a locking device provided between the base member and the attachment member for locking the base member in the attachment member by the engagement of the engaging portions provided at the base member with locking portions provided at the attachment member, wherein the locking device sets an initial distortion of the optical fiber cable for the correction of a zero of a measurement value by differing intervals of the locking portions provided at the attachment member from those of the engaging portions provided at the base member to give a distortion resulting from elongation or contraction to the base member locked in the attachment member.

3. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, and a locking device provided between the base member and the attachment member for locking the base member in the attachment member, wherein the base member holds two or three optical fiber cables at specified distances from each other, thereby enabling the measurement of at least one state quantity from the elongation, bending and partial lateral pressure of the structure on which the optical fiber measuring module is laid from measurement values of distortions of optical fiber cables and an increasing/decreasing pattern of the measurement values.

4. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, and a locking device provided between the base member and the attachment member for locking the base member in the attachment member, wherein the base member is strip-shaped and holds two optical fiber cables along the longitudinal direction of the base member at a specified distance form each other.

5. An optical fiber measuring module to be laid on a structure for measuring at least one physical quantity from the distortion and temperature of the structure, comprising:

an optical fiber cable including an optical fiber core, a cladding and a covering layer, a base member for holding the optical fiber cable, and an attachment member for attaching the base member to the structure, wherein the base member includes a strip-shaped flat portion and a wall portion standing substantially upright substantially in the middle of the flat portion, two optical fiber cables are held along the longitudinal direction of the flat portion at a specified distance from each other, and another optical fiber cable is held along the longitudinal direction of the wall portion.

6. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, and a locking device provided between the base member and the attachment member for locking the base member in the attachment member, wherein the base member is formed to have a tubular shape, and three optical fiber cables are held along the longitudinal direction of the inner wall of the tubular base member at specified distances from each other.

7. An optical fiber measuring module according to claim 6, wherein the optical fiber cables are spirally held on the inner wall of the tubular base member.

8. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, and a locking device provided between the base member and the attachment member for locking the base member in the attachment member, wherein the base member is formed with slits for enhancing the flexibility of the base member, the slits being spaced from the optical fiber cable, and the optical fiber measuring module can be so laid as not to exceed a permissible distortion of the optical fiber cable upon being handled.

9. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, and a locking device provided between the base member and the attachment member for locking the base member in the attachment member, wherein the base member is formed with slits for enhancing the flexibility of the base member, the slits being spaced from the optical fiber cable, whereby distortion of the optical fiber cable can be prevented from exceeding a permissible value even in response to an excessive deformation of the structure on which the optical fiber measuring module is laid.

10. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, and a locking device provided between the base member and the attachment member for locking the base member in the attachment member, wherein the base member holds the optical fiber cable in a wavy manner defining peaks and troughs and tangents extending from each of the peaks to the adjacent troughs, notches being defined on the base member at locations where extensions of the tandents of the optical fiber cable intersect lateral edges of the base member, whereby distortion of the optical fiber cable resulting from bending can be prevented from exceeding a permissible distortion by bending the base member along the notches and the optical fiber cable to cause the optical fiber cable to be only twisted.

11. An optical fiber measuring module to be laid on a structure for measuring at least one physical quantity, comprising:

optical fiber cables, base members for holding the optical fiber cables, the base members having a standardized length, attachment members for attaching the base members to the structure wherein the base members are configurable for being attachable to the attachment members while the base members are holding the optical fiber cables;

attaching devices provided between the attachment members and the structure for attaching the attachment members to the structure, locking devices provided beween the base members and the attachment members for locking the base members in the attachment members, and coupling portions of the optical fiber cables provided at the opposite ends of each base member, wherein the coupling portions of the optical fiber cables are optically coupled to each other to successively connect the base members, thereby enabling structures of different sizes to be handled.

12. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, a locking device provided between the base member and the attachment member for locking the base member in the attachment member, and a polarizing ring formed by looping the optical fiber cable, wherein a polarized state of a signal light propagating in the optical fiber cable is corrected by the polarizing ring.

13. An optical fiber measuring module to be laid on a structure for measuring at least one physical quantity from the distortion and temperature of the structure, comprising:

an optical fiber cable including an optical fiber core, a cladding and a covering layer, a base member for holding the optical fiber cable, an attachment member for attaching the base member to the structure, a polarizing ring formed by looping the optical fiber cable, wherein a polarized state of a signal light propagating in the optical fiber cable is corrected by the polarizing ring, a ring base member for holding the optical fiber cable forming the polarizing ring, and a loading mechanism capable of giving a distortion in a circumferential direction of the ring base member, wherein the optical fiber cable held by the ring base member is distorted to correct the distortion by giving the distortion in the circumferential direction of the ring base member by means of the loading mechanism.

14. An optical fiber measuring module according to claim 13, wherein the loading mechanism includes:

a discontinuous portion provided in the ring base member, a loading member which can be held in contact with the opposite ends of the ring base member facing the discontinuous portion, and a loading-member shaft provided substantially in the center of the loading member and rotatably supporting the loading member, wherein the length of the discontinuous portion of the ring base member is changed by rotating the loading member about the loading-member shaft, thereby changing the distortion of the ring base member.

15. An optical fiber measuring module to be laid on a structure for measuring at least one physical quantity, comprising:

an optical fiber cable, a base member for holding the optical fiber cable, an attachment member for attaching the base member to the structure wherein the base member is configured for being attachable to the attachment member while the base member is holding the optical fiber cable;

an attaching device provided between the attachment member and the structure for attaching the attachment member to the structure, and a locking device provided between the base member and the attachment member for locking the base member in the attachment member, wherein the locking device has a zipper structure.

16. An optical fiber measuring module according to claim 12, wherein the zipper structure comprises hooked engaging portions provided on the base member and hooked locking portions provided on the attachment member. The base member being detachably locked to the attachment member by successively engaging portions with the locking portions from one end of the locking means.

* * * * *